United States Patent [19]

Pietzsch et al.

[11] 4,333,543

[45] Jun. 8, 1982

[54] WHEEL OR AXLE LOAD MEASURING DEVICE FOR ROAD VEHICLES

[75] Inventors: Ludwig Pietzsch, Rittnerstr. 36, 7500 Karlsruhe, Fed. Rep. of Germany; Knut Overlach, Karlsruhe; Hans J. Eberhard, Rheinstetten, both of Fed. Rep. of Germany

[73] Assignee: Ludwig Pietzsch, Karlsruhe, Fed. Rep. of Germany

[21] Appl. No.: 135,534

[22] Filed: Apr. 10, 1980

[30] Foreign Application Priority Data

Apr. 11, 1979 [DE] Fed. Rep. of Germany ....... 2914600
Apr. 11, 1979 [DE] Fed. Rep. of Germany ... 7910586[U]

[51] Int. Cl.³ .............................................. G01G 19/02
[52] U.S. Cl. ...................................... 177/134; 177/211
[58] Field of Search ........................ 177/211, 132–135; 73/141 A, 862.65

[56] References Cited

U.S. PATENT DOCUMENTS 4,098,365 7/1978 Pietzsch ............................. 177/211

*Primary Examiner*—Joseph W. Hartary
*Attorney, Agent, or Firm*—Montague & Ross

[57] ABSTRACT

A measuring plate with at least one strain gauge and upon which a wheel of a vehicle can rest to generate a signal which is used to indicate or register the wheel load or axle load of the road vehicle, is received in a frame and has edges which extend transversely of the direction of vehicle travel. According to the invention, these edges are bevelled or partly cut away so as to be overhung by complementarily shaped sides of the frame. These edges also are provided, along the bottom of the plate, with elastic bars or ribs which rest upon and support the center of the plate above a support plate or body disposed below the measuring plate. The plate can have these edges covered with an elastic material, especially a clear elastomer or the entire measuring plate can be sheathed in the elastomer.

14 Claims, 7 Drawing Figures

WHEEL OR AXLE LOAD MEASURING DEVICE FOR ROAD VEHICLES

FIELD OF THE INVENTION

Our present invention relates to the measurement of wheel or axle loads and, more particularly, to a strain gauge system adapted to be set in or on the ground and having edges extended transversely to the direction of vehicle travel for scaling, registering or indicating as a vehicle passes thereon and comes to rest thereon, the wheel load or axle load of a road or street vehicle.

Specifically, the invention relates to systems of the above described type having a measuring plate which can have edges extending transversely to the direction of travel and on which or in which there can be mounted one or more strain gauge elements which respond to the distortion of this plate by the vehicle load so as to provide a measurement of the type described.

BACKGROUND OF THE INVENTION

Wheel or axle load measuring devices are, of course, known to the art and can utilize one or more strain gauges (generally a plurality of strain gauges connected in a bridge circuit) which can be associated with appropriate circuitry responding to the distortion of the measuring plate for signalling, indicating, recording or registering the wheel or axle load.

However, problems have been encountered with at least that portion of the device which is mounted in the ground or on the ground. For example, it is known to mount the measuring plate with a frame which lies against the edges of the measuring plate. However, such systems have disadvantages in that the measurement is frequently dependent upon the measuring tolerances of the plate and the frame, temperature fluctuations and various stresses to which the frame may be subject.

OBJECTS OF THE INVENTION

It is the principal object of the present invention to provide an improved measuring unit for a wheel load or axle load measuring system utilizing strain gauges whereby disadvantages of earlier systems can be obviated.

Another object of this invention is to provide a detail for measuring wheel or axle load of street or road vehicles which gives greater precision and freedom from environmental inaccuracies than has heretofore been the case.

Yet another object of this invention is to provide a low cost, reliable and accurate measuring unit of the type described, utilizing a frame, but wherein the effects of the frame in reducing the precision of the measurement can be excluded.

SUMMARY OF THE INVENTION

These objects and others which will become apparent hereinafter are obtained in accordance with the present invention, in a measuring unit for a system of the type described in which the measuring plate has at least two edges extending transversely to the direction of vehicle traffic and is peripherally enclosed in a frame having frame members along these edges, the underside of the measuring plate which carries at least one strain gauge being provided with elastic bars or ribs parallel to the aforementioned edges which support inner portions of the plate above an underlying member.

According to the invention, the edges of the measuring plate which run transversely to the direction of travel and the corresponding members or lines of the frame have complementary and mutually contacting surfaces which are inclined or bevelled with the frame limbs overhanging these bevelled surfaces of the measuring plate. The frame should at least in sections, overhang the edges of the plate. This construction has been found to reduce or completely eliminate discrepancies in the measurement which may result from fabrication tolerances, temperature fluctuations and the like.

So that the edges of the measuring plate and the enclosing members of the frame are sufficiently spaced to allow distortion of the plate without permitting contaminants, water or the like to penetrate between them, the present invention provides that at least the bevelled edges of the measuring plate are coated with an elastic material. The elastic material also serves to compensate for all manufacturing tolerances and prevents a transmission of stresses from the frame to the measuring plate as a consequence of temperature fluctuations. Thus the elastic covering of at least the bevelled edges further improves the measuring precision.

The same elastic material, can be applied to the upper and lower surfaces of the measuring plate and can connect with the edge coverings so that the entire measuring plate is enclosed in a sheath of the elastic material. Not only does this expedient, which is effective even without bevelled-edge measuring plates, assist in preventing the incursion of moisture, but it also precludes corrosion of the measuring plate and a separation of the edge coverings because of corrosive action. The sheath also protects the strain gauge strips.

According to a further feature of the invention, the covering is composed of a clear or transparent elastomer so that metallic reflective qualitites of the plate are retained in spite of the application of the covering. As a result, heat and light reflection is at a maximum and heat absorption is minimized so that even prolonged solar radiation upon the measuring plate does not affect the precision.

It has been found to be advantageous, moreover, to bond the elastic bars or ribs to the covering of the measuring plate by vulcanization. This vulcanization step can be the same vulcanization which sets the covering, thereby eliminating the need for any bonding step in addition to that which permanently secures the elastomer to the measuring plate.

The elastic bars are advantageously reinforced by fabric inlays which improve the form factor of the bar and limit creep of the elastic material under loading.

The term "form factor" is used here in its customary sense to refer to the ratio of the force-loaded surface area to the free area perpendicular thereto. To the extent that this ratio remains constant on the load, the bar is retentive. In the preferred application of the present invention, in which the fabric inlay lies parallel to the plate, the free cross section may be reduced somewhat under load while the pressurized surface remains more or less constant.

It has been found to be advantageous, moreover, to provide the limbs of the frame which extend along the bevelled surface of the measuring plate with projections in the direction of the bevelled surfaces so that the actual contact between these limbs and the bevelled edges extends over only a limited part of the bevel. Thus, even if stresses tend to be transmitted to the measuring plate from the frame, these stresses are applied over relatively small areas and can be compensated by yielding of the elastic covering.

While the edges of the measuring plate transverse to the direction of travel are bevelled in the preferred embodiment of the invention in the manner already described, it has been found that this bevelling need not be continuous, i.e. the edge can be stepped so as to be partly overhung by the limbs of the frame. In both cases, however, the upper surface of the frame should be flush or coplanar with the upper surface of the covering of the measuring plate.

For greatest precision, we have found it desirable to form the bevel of the frame so that it lies along a tangent to a circular arc centered at the middle of the elastic bar at its contact with the supporting surface and passing through the outermost point of the measuring plate. As a consequence of this configuration the bending of the measuring plate under load results only in parallel shifting of the edges relative to the frame so that a stressing interaction is precluded.

The width of the elastic bars can vary along their lengths and greatest precision has been found to apply when the width of the bars is varied so that transverse sensitivity of the bar is uniform along its length and at each point along the measuring plate. Since the measuring plate is not rigid but bends under load, the pressure applied to the bar is not the same over the entire width of the bar but rather increases from the side of the bar turned away from the edge, inwardly. As a consequence resultant forces act nonuniformly upon the cross section of the bar.

According to the invention, therefore, the elastic bars are of progressively reducing thickness toward their edges and they taper less toward the edges of the plate than inwardly.

It is another feature of this invention that the elastic bars are so dimensioned that all loads applied to the measuring plate produce resultant forces which pass through a given point. The underside of each bar can have the configuration of a lop-sided trapezoid whose small base is turned downwardly, or the configuration of a geometrical curve such as a parabola or a curve of a higher order such as an involute, a cycloid or the like in cross section.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
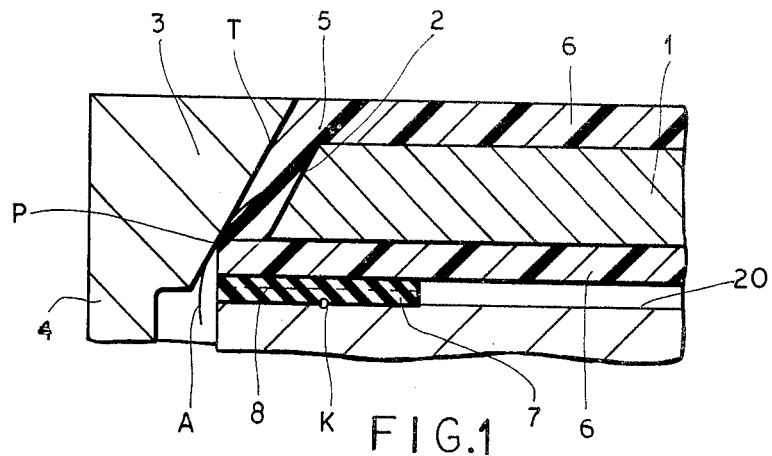
FIG. 1 is an edge section illustrating an embodiment of a measuring plate according to the invention.
Figure 1A:
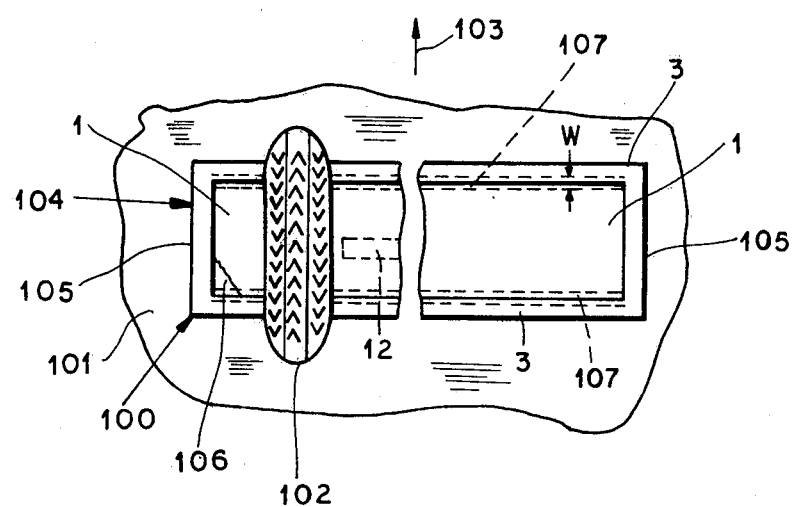
FIG. 1A is a plan view of the measuring plate system of the invention.

As can be seen from FIG. 1A, a wheel or axle load measuring device 100 can be disposed in the pavement 101 so that a wheel 102 of a vehicle traveling in the direction of the arrow 103 can pass over the measuring plate 1. The measuring plate 1 is received in a frame 104 having frame limbs or members 3 transverse to the direction 103 of travel of the vehicle, and limbs 105 parallel to the direction of travel. The measuring plate is provided with a plurality of strain gauge strips 12 which can be connected to indicating, registering or recording circuitry known per se and is encased in a transparent synthetic resin layer 106 which can be any of the coverings described subsequently.

The measuring plate 1 is mounted upon a support plate as will be described subsequently by a pair of ribs or bars 107, representing all of the bars or ribs would be subsequently described and which may have a varying width W as indicated in FIG. 1A over its length so that the transverse response to each point along the measuring plate will be the same.

FIGS. 1 through 6 illustrate various embodiments of the measuring plate, covering, bars and frame.

As can be seen from FIG. 1, the measuring plate 1 can have bevelled edges 2 extending transversely to the direction of travel while the overhanging portions 3 of the frame limbs 4 transverse to the direction of travel are complementarily bevelled or inclined. The edges 2 are coated with an elastic layer 5 and this elastic layer can extend unitarily at 6 over the upper and lower surfaces of the plate to completely sheath the latter.

At the bottom of the plate, the layer 6 is vulcanized to a pair of ribs or bars 7 of elastic material, the bars 7 being provided with fabric inlays 8 and resting upon a support plate. The bevel angle is so selected that the bevelled face lies along a tangent T to a circular arc A centered at K at the middle of the bar 7, the circle passing through the point P which is the outermost point of the measuring plate at which the circle meets the tangent T.

Figure 2:
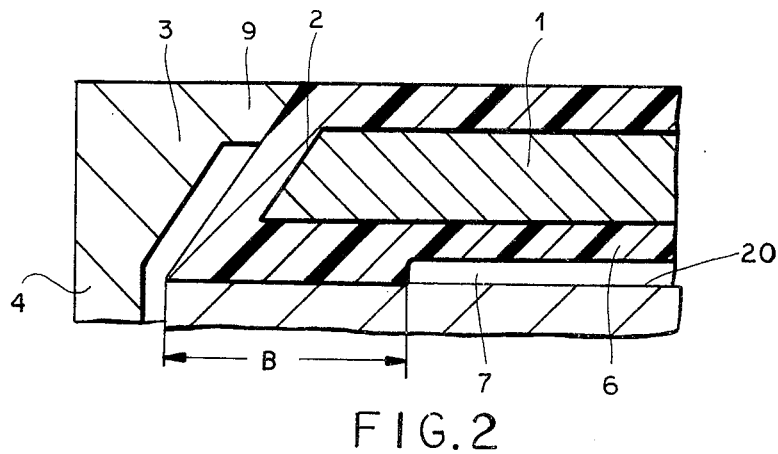
FIGS. 2 through 6 are other edge sections of plates illustrating other embodiments and aspects of the invention.
Figure 3:
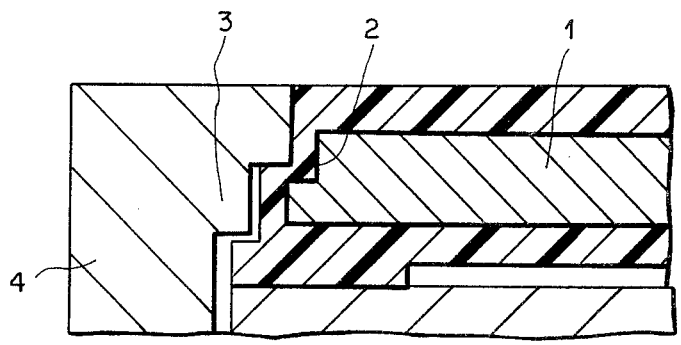

From FIG. 2 it will be apparent that the overhanging portion 3 of the frame need not lie against the entire bevel 2 of the plate 1 but can be formed with an overhanging portion 9 which meets the bevel only at the top. An analogous projection is formed by the stepped configuration of FIG. 3. In both of these embodiments, the elastic bar by which the plate rests upon the support plate 20 is formed unitarily with the sheath 5, 6 of the plate. The width B of this bar varies along its length as has been described in connection with FIG. 1A.

Figure 4:
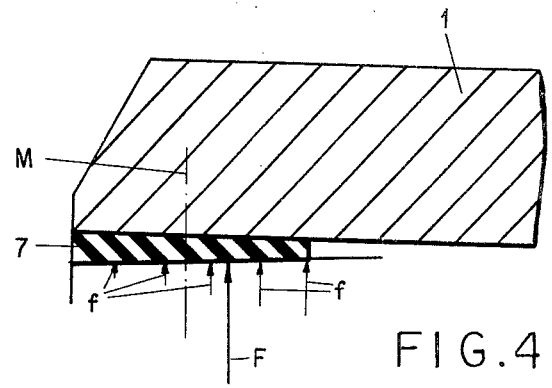
Figure 5:
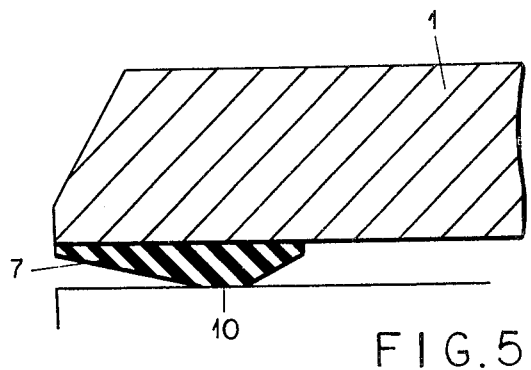
Figure 6:
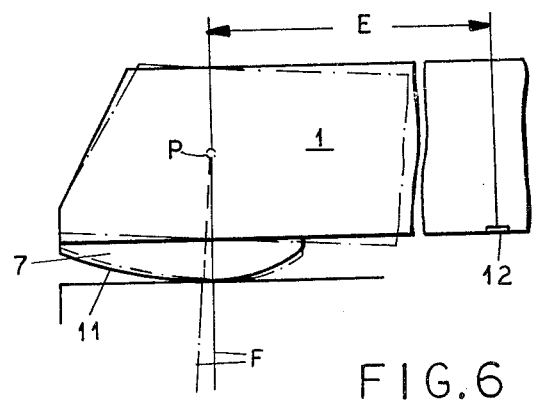

FIG. 4 shows that the surface pressure F increases inwardly (as represented by longer vectors f) when the measuring plate is placed under load, thereby shifting the force resultant F toward the inner edge of the bar from the center M. As a result, the bar should have an asymmetrical configuration, e.g. as shown in FIGS. 5 and 6 wherein the bar converges toward its edges in cross section, more sharply toward the inner edge and less sharply toward the outer edge. The bar has a lop-sided trapezoid cross section in FIG. 5 resting upon its small base.

In the embodiment of FIG. 6 the bar has a geometric curvature shown at 11 dimensioned so that the resultant forces F under load all pass through a common point thereby ensuring that the resultants are at a fixed distance E from the strain gauge strip 12.

We claim:
1. A road or axle load measuring device comprising:
   a frame having a pair of limbs extending transversely to the direction of travel of a vehicle whose axle or wheel load is to be measured;
   a measuring plate received in said frame and having edges extending along said limbs, said edges diverging downwardly so as to be partly overhung by said limbs;
   at least one strain gauge strip mounted on said measuring plate; and a pair of elastic bars formed on the underside of said measuring plate along said edges for supporting said measuring plate upon a surface whereby said measuring plate deformes between said bars when loaded by a wheel.

2. The device defined in claim 1, further comprising an elastic covering formed on said edges.

3. The device defined in claim 2 wherein said covering completely encloses said plate.

4. The device defined in claim 3 wherein said covering is composed of a clear elastomeric material.

5. The device defined in claim 3 wherein said bars are vulcanized to said covering.

6. The device defined in claim 1 wherein said bars are provided with fabric inlays.

7. The device defined in claim 1 wherein said edges are bevelled and said limbs have inward projections bearing upon only limited portions of the respective bevels.

8. The device defined in claim 1 wherein said edges are stepped.

9. The device defined in claim 1 wherein said edges are bevelled and said limbs have complementary bevels, the bevels along each edge being tangent to a circle centered at the middle of the respective bar at a point along said circle including the outermost point of said plate along the respective edge thereof.

10. The device defined in claim 1 wherein said bars have a width which changes along its length to provide a constant transverse response therealong.

11. The device defined in claim 1 wherein each of said bars converges in cross section toward its edges with a steeper convergence inwardly and a shallower convergence outwardly.

12. The device defined in claim 1 wherein each of said bars is shaped so that the resultant forces upon bending of said plate through the respective bars pass through respective given points.

13. The device defined in claim 1 wherein said bars have the cross section of lop-sided trapezoids with the small base turned downwardly.

14. The device defined in claim 1 wherein said bars have downwardly turned surfaces of parabolic, involute or cycloid configuration.

* * * * *